United States Patent [19]

Jaeger et al.

[11] 3,927,155

[45] Dec. 16, 1975

[54] METHOD FOR PRODUCING PARTICULATE MATERIAL AND CERAMIC BODIES THEREFROM

[75] Inventors: Raymond Edward Jaeger, Basking Ridge; Thomas John Miller, Greenbrook, both of N.J.

[73] Assignee: Bell Telephone Laboratories, Incorporated, Murray Hill, N.J.

[22] Filed: Dec. 17, 1973

[21] Appl. No.: 425,183

Related U.S. Application Data

[63] Continuation-in-part of Ser. No. 180,504, Sept. 14, 1971, abandoned.

[52] U.S. Cl. .................................... 264/6; 264/56
[51] Int. Cl.² ........................................ B01J 2/06
[58] Field of Search .................. 264/5, 14, 56, 6

[56] References Cited
UNITED STATES PATENTS

| | | | |
|---|---|---|---|
| 3,290,122 | 12/1966 | Clinton et al. | 264/14 |
| 3,384,687 | 5/1968 | Flack et al. | 264/14 |
| 3,795,724 | 5/1974 | Paul et al. | 264/56 |

*Primary Examiner*—Robert F. White
*Assistant Examiner*—J. R. Hall
*Attorney, Agent, or Firm*—P.V.D. Wilde

[57] ABSTRACT

A method for producing particulate material includes the steps of atomizing solutions of metal salts, introducing the atomized droplets into a drying liquid in which the salts are insoluble but with which the solvent is miscible, resulting in interdiffusion of the drying liquid and the solvent leaving the salt in the form of insoluble solid particles, and separating the salt particles from the liquid. Such material may, with further processing, find use in filter or resin beds, as catalyst supports or abrasives, or in compacted bodies such as polycrystalline metals, ceramics or glasses, or may represent an intermediate or end product in recovery or waste disposal operations.

4 Claims, No Drawings

METHOD FOR PRODUCING PARTICULATE MATERIAL AND CERAMIC BODIES THEREFROM

CROSS REFERENCE TO RELATED APPLICATION

This application is a continuation-in-part of our co-pending application, Ser. No. 180,504, filed Sept. 14, 1971 now abandoned.

BACKGROUND OF THE INVENTION

1. Field of the Invention

This invention relates to a method for producing particulate material by the liquid drying of salt solutions of such material and to a method for producing ceramic bodies from such particulate material.

2. Prior Art

Multicomponent ceramic bodies such as, for example, refractory oxidic bodies, have traditionally been produced by a series of procedural steps including grinding and mixing of the starting materials which, depending upon the application, may become prolonged to achieve the uniform, finely divided state needed for the desired compositional uniformity and bulk density. Such steps are typically carried out in a ball mill or other container from which significant pickup of impurities often results. Furthermore, increasing sophistication and miniaturization of devices, particularly in the electronics field, give rise to compositional uniformity requirements which are practically unattainable by conventional mixing and grinding steps regardless of their duration.

The achievement of compositional uniformity by mixing on an atomic scale has recently been realized by the development of cryochemical processing techniques. For example, in U.S. Pat. No. 3,516,935 issued to F. R. Monforte et al. on June 23, 1970 and assigned to the present assignee, there is described a method for producing compacted bodies essentially involving the formation of particulate material by freeze-drying techniques, followed by conventional processing steps of, for example, conversion, compaction and firing. In such freeze-drying, a salt solution whose solute is capable of yielding the desired composition is broken up into droplets. These droplets are then quick-frozen, thus insuring a compositional uniformity on a scale which may be of the order of microns. Dried particles are thereafter obtained by removing frozen solvent by sublimation typically over a period of up to 48 hours.

Compacted bodies produced from such freeze-dried particles exhibit excellent compositional uniformity, as well as the absence of contaminants normally associated with processes including conventional mixing and grinding. In addition, the characteristic uniformly finely divided particulate product often enables the achievement of densities which are comparable to those obtainable by conventional processing only at higher firing temperatures or longer times or both.

Nevertheless, the fact that the freeze-drying technique necessitates operation under cryochemical conditions together with the fact that melting sometimes occurs during drying, leading to segregation and agglomeration, has prompted the investigation of possible alternative material preparation techniques.

SUMMARY OF THE INVENTION

The preparation of particulate material (including multicomponent particles having a high degree of compositional uniformity) is achieved by introducing droplets of an initial solution of at least one metal salt into a drying liquid in which the salts are substantially insoluble but with which the solvent is substantially miscible, whereupon the drying liquid and solvent from the droplets interdiffuse, leaving no liquid in which the salt has substantial solubility so that the salt is forced from solution as solid particles.

Microscopic motion picture studies of the progress of the drying operation have shown that the droplets retain their integrity as a phase separate from the drying liquid. This results from the fact that, although the solvent and the drying liquid may themselves be completely miscible, the presence in the solvent of a salt which is relatively insoluble in the drying liquid prevents complete miscibility of the solution and the drying liquid so that a phase boundary is established at the surface of the droplet. Diffusion of the liquids across this boundary reduces the amount of solvent available for maintaining the salt in solution so that the salt is crystallized from solution until ultimately a solid salt phase is the only identifiable component remaining of the original droplet.

These particles are then removed from the resultant liquid, which is now a solution of the original solvent in the drying liquid. For purposes of the invention, this solution will be referred to as the final solution, in order to distinguish it from the initial salt solution. Depending upon their composition and the conditions of formation, such particulate material may be useful, with further processing, in filter or resin beds, as catalyst supports or abrasives, as starting materials in formation of a compacted polycrystalline body of a metal or ceramic composition, or a glass, or may represent an intermediate or end product in solid recovery or waste disposal operations.

Since in many cases the final chemical form desired for the particulate material will be insoluble in water and other common solvents, it will sometimes be necessary in the practice of the invention to form a solution of soluble compounds capable of yielding the desired components, and to convert the particles to the desired form after recovery from the final liquid. Such conversion may take any suitable form, such as thermal decomposition or chemical reaction or reduction.

Further processing to form a polycrystalline refractory body may include formation of a compact, followed by one or more pre-sintering steps such as calcining, followed by sintering.

DETAILED DESCRIPTION

Formation of solutions to be liquid dried will sometimes necessitate selecting soluble components capable of chemical conversion to the desired form. For example, where the desired components are metals or oxides, forms which are soluble in water include sulfates, citrates, formates, acetates, oxalates, cyanides and nitrates. In multicomponent systems, it is preferred that the solute system contain a single anion since in a mixed anion system mutual solubility of all cation-anion combinations may not be achievable. In addition, some salts may be slightly soluble in the drying liquid, the extent dependent upon the anion species. Thus, use of a single anion system is preferred where it is desired to avoid even slight shifts in stoichiometry from a desired composition, due to differential solubilities of the solute components which may exist in a mixed anion system. It is, of course, possible to tolerate varying degrees of solubilities of the solute in the drying liquid depending upon the final application envisioned, substantially greater solubilities being tolerable for single component systems than for multicomponent systems. In general, it may be said that solubilities in excess of 1 percent render the drying liquid unsuitable for use with that solute system.

Adjustment of the pH of aqueous salt solution may sometimes be indicated in order to stabilize or to achieve complete solubility of the solute, as is known. The pH should be maintained at a value below that at which precipitation of hydroxide occurs.

It is an advantage of this technique that mixing of multicomponent salt systems occurs on a molecular scale by dissolution in the initial solvent. Such mixing may be accelerated by mechanical stirring and/or heating, particularly where concentrations near the saturation limit are desired. Such concentrations are in general preferred in that they result in shorter drying times, i.e., the time required for complete interdiffusion of the solvent from the droplets with the drying liquid after their introduction into the drying liquid, increased yield of dried particles per volume of solvent, and increased bulk density of the dried product. As used herein, the terms "dried particles" or "dried product" refer to the salt particles remaining after substantially complete interdiffusion of the solvent and the drying liquid, whether or not these particles have yet been recovered from the final solution.

As already stated, the drying liquid must also be one which is miscible with the solvent. Where water is the solvent and the salts are sulfate, acetates, oxalates, citrates, formates or cyanides, suitable drying liquids include acetone, ethyl alcohol, methyl alcohol, and fluoroalcohol, having the generic formula $H-(CF_2)_m-CH_2OH-(CF_2)_n-H$ where $m$ is an integer from 1 to 5 and $n$ is an integer from 0 to 5.

The above examples are in no way intended to be limiting. Other solvent-solute-drying liquid combinations may be readily found which will satisfy the criteria set forth above. For example, certain salts are soluble in acetone but substantially insoluble in water so that for these salts the functional roles of the liquids are reversed.

While simple bulk mixing of the solution and drying liquid will generally result in the obtaining of a dried product, it is preferred for the obtaining of a uniform, finely divided particulate product to form droplets of the solution such as by atomization prior to introduction into the drying liquid. Such droplet formation may take any conventional form such as forcing the solution through a small orifice to form a spray. Agitation of the liquid, such as by stirring, may be carried out to aid in maintaining dispersal of the droplets so as to minimize the opportunity for coalescence during drying.

A principal advantage of this drying technique is that a homogeneous multicomponent product (e.g., a glass, ceramic or metal) may be obtained under a variety of conditions regardless of droplet size, drying time, solution concentration, etc. Nevertheless, small droplet sizes are in general preferred in that they result in minimal drying times leaving little chance for droplet coalescence, particle agglomeration, or segregation of components, and thus enabling the obtaining of a finely divided particulate product having a high surface area and thus a high reactivity during subsequent conversion or sintering steps.

In view of these considerations a convenient range of droplet sizes has been found to be from 1/100 to 2 millimeters within which range drying occurs within a few seconds to a few minutes and the dried particulate product after conversion generally exhibits a surface area within the range of 1 to 200 square meters per gram.

Since the affinity of the drying liquid for solvent tends to diminish as the amount of solution introduced is increased, the volume of drying liquid should in general be somewhat greater than the volume of solution, a ratio of at least 5 to 1 ordinarily insuring the obtaining of a suitably dried product. However, for optimum efficiency, a ratio of at least 10 to 1 is preferred. Higher ratios are limited only by considerations of economy of materials or apparatus. In this regard it is noted that the drying liquid may be periodically or continuously restored by subjecting it to a separation process such as distillation.

The dried particulate material which results may be recovered from the liquid by any convenient means such as filtering, centrifuging, decanting of the supernatant liquid (if the particles settle to the bottom of the liquid) or scraping the particles from the surface (if they float to the top of the liquid).

Depending upon the final use envisioned for the recovered dried particulate product, it may be processed further in any of a variety of ways. It may, for example, be washed to remove residual entrapped liquid or adsorbed additives. It may be comminuted to increase surface area and thus reactivity. Depending upon the conditions of formation, the product may be quite friable and in some cases may easily be crushed by forcing it through a fine screen.

Conversion of the product to another chemical form will usually be by heating in an oxidizing or neutral atmosphere to promote thermal decomposition or heating in a reducing atmosphere to achieve chemical reduction. In general, thermal decomposition of the sulfates, acetates, oxalates, citrates, formates, nitrates and cyanides to oxides and gas may be carried out within the range of 200°C to 1200°C.

Mixing and/or milling steps are usually unnecessary for the achievement of compositional uniformity in multicomponent particles, homogeneity of composition having been assured during liquid drying; likewise, such steps are usually unnecessary to the obtaining of fine particle sizes, such sizes being controllable by droplet size, solution concentration and calcination temperature. Such fine particle sizes are significant in that they generally exhibit a high reactivity permitting the achievement of dense polycrystalline bodies (by sintering particle compacts) and glasses (by melting particles) at conditions less severe (lower temperature and/or shorter time) than those required for particles of larger size.

The following examples illustrate the advantages of the inventive technique.

EXAMPLE 1

A 20 weight percent solution of $Al_2(SO_4)_3 \cdot 18H_2O$ in water was prepared and dried by feeding it through a 0.01 inch orifice at a uniform flow rate of about 20 milliliters per minute to form droplets and spraying the droplets into the vortex of a swirling bath of acetone having 10 times the volume of the solution so introduced. Stirring of the acetone bath was continued for about 30 minutes thereafter. Substantially all droplets were replaced by solid particles essentially instantaneously after introduction. The thus dried particulate product was then removed from the acetone-water solution by filtering, washed with acetone, oven dried, and separated into four portions, each of which was calcined for 2 hours in air at one of the temperatures shown in Table I. The entire procedure was repeated for two additional 20 weight percent solutions of aluminum sulfate to which was added sufficient $MgSO_4$ to result in 0.1 and 0.3 weight percent MgO, respectively, in the calcined product. Variations in surface area of the calcined products with temperature are shown in Table I.

Table I

| Calcined Composition | Surface area (meters squared per gram) of the composition after calcining at: | | | |
|---|---|---|---|---|
| | 850°C | 900°C | 1000°C | 1100°C |
| $Al_2O_3$ | 181 | 147 | 156 | 37 |
| $Al_2O_3$ + 0.1 wt percent MgO | — | 154 | 169 | 95 |
| $Al_2O_3$ + 0.3 wt percent MgO | — | 142 | 157 | 93 |

As may be seen from the table, higher calcining temperatures in general result in decreased surface area and therefore decreased reactivity of the calcined product. The additions of MgO are seen to be somewhat effective as grain-growth inhibitors, particularly at 1100°C.

The $Al_2O_3$ sample which was calcined at 1100°C was chosen to be processed into a polycrystalline body. The following conditions are representative of the conventional preparation of $Al_2O_3$ bodies. The sample was passed through a 325 mesh nylon screen, formed into a disc compact by isostatic pressing at 20,000 p.s.i. and presintered at 1350°C for 2 hours in air. The disc was then surface ground to a thickness between 0.02 and 0.03 inches and sintered at 1700°C for 1 hour in dry hydrogen. The sintered density was 3.943 grams per cubic centimeter or 98.6 percent of the theoretical density, which is substantially higher than densities obtainable in the absence of grain growth inhibitors under comparable conditions but using conventional mixing and/or milling material preparation techniques.

EXAMPLE 2

An aqueous solution of $MgSO_4.7H_2O$, $MnSO_4.H_2O$ and $FeSO_4.7H_2O$ in cation ratios corresponding after calcining to the composition ($Fe_{1.822} Mg_{0.643} Mn_{0.545})O_4$ and containing 107 milligrams of cations per milliliter of solution was prepared. The solution was formed into a particulate product in accordance with the procedure of Example 1. The product was separated into 4 portions, 3 of which were calcined in nitrogen for 1 hour at different temperatures. The surface areas of the uncalcined and calcined products are shown in Table II.

Table II

| Calined Composition | Uncalcined | Surface area (meters squared per gram) of the calcined composition at: | | |
|---|---|---|---|---|
| | | 800°C | 850°C | 900°C |
| ($Fe_{1.822}Mg_{0.643}$ $Mn_{0.545})O_4$ | 1.5 | 4.2 | 3.6 | 3.0 |

It is seen that higher calcining temperatures tend to reduce the surface area of the dried product.

The product which was calcined at 900°C was chosen to be processed into a polycrystalline body. The following conditions are representative of conventional preparation of $MgMnFeO_4$ bodies. The sample was passed through a 325 mesh nylon screen, mixed with about 6 weight percent of a 10 weight percent solution of polyvinyl alcohol binder, again passed through the 325 mesh nylon screen and pressed at 50,000 p.s.i. in a toroid-shaped die to form a compact having an outside diameter of 0.286 inches and an inside diameter of 0.226 inches. The compact was then sintered at 1350°C for ten hours in oxygen and cooled in a nitrogen atmosphere. The sintered density was 4.66 grams per cubic centimeter, or 100 percent of theoretical density, which is substantially higher than densities obtainable under comparable conditions but using conventional mixing and/or milling material preparation techniques.

EXAMPLE 3

Three different 20 weight percent solutions of $MgSO_4$, $Al_2(SO_4)_3$ and $MgAl_2(SO_4)_4$ respectively were prepared and formed into a particulate product in accordance with the procedure of Example 1. Each of the products was then subjected to thermogravimetric analysis, which revealed that the decomposition of $MgSO_4$ to MgO occurred at 1000°C, the decomposition of $Al_2(SO_4)_3$ to $Al_2O_3$ occurred at 850°C, and the decomposition of the combined salts occurred at 760°C. The fact that the combined salts decomposed at a single temperature different than either of the individual salts indicates that the individual salts became associated chemically during drying and that therefore no significant segregation within the dried particles occurred.

EXAMPLE 4

Twenty weight percent aqueous solutions of the various metal salts shown in Table III were prepared and formed into particulate products in accordance with the procedure of Example I. The product in each case was a uniform, finely divided particulate material.

Table III

| Soln. | Metal Cations | Anion | Drying Liquids |
|---|---|---|---|
| 1 | Mg | Sulfate | Acetone, tetrafluoroisopropanol |
| 2 | Mn | Sulfate | Acetone, tetrafluoroisopropanol |
| 3 | $Fe^{2+}$ | Sulfate | Acetone, tetrafluoroisopropanol |
| 4 | $Fe^{3+}$ | Sulfate | Acetone, tetrafluoroisopropanol |
| 5 | Zr | Sulfate | Acetone, tetrafluoroisopropanol |
| 6 | 1/2 Mg, Al | Sulfate | Acetone, tetrafluoroisopropanol |
| 7 | Cu | Sulfate | Acetone, tetrafluoroisopropanol |
| 8 | 1/10 Mg, Zr | Sulfate | Acetone, tetrafluoroisopropanol |
| 9 | Pb | Acetate | Acetone, tetrafluoroisopropanol |
| 10 | Ti | Oxalate | Acetone, tetrafluoroisopropanol |
| 11 | Au* | Cyanide* | Methanol |

*Gold cyanide plating bath containing in ounces per gallon of solution; 1 oz. $KAU(CN)_2$, 2 oz. KCN.

While the description has sometimes been in terms of the preparation of a solution having a desired composition to eventually produce a compacted body having at least the cation ratios present in the solution, other applications of this technique will become apparent. For example, solids may be recovered from spent chemical plating, etching, or metal finishing baths. In the plating industry, for example, it may be found attractive to recover precious metals from spent plating baths by this technique at the plating site, rather than to resort to slower and more costly techniques, such as pan evaporation, perhaps necessitating shipping the solutions in bulk to another location to be processed.

In addition, as has been mentioned, the dried particulate product may be useful as a catalyst support, resin or filter bed, or abrasive. As already stated, conversion from a soluble form to the desired form may be necessary. Further processing may include further thermal treatment to increase strength, decrease porosity, etc.

What is claimed is:

1. The method of forming a metal oxide ceramic body avoiding any intermediate hydroxide state, comprising
   a. preparing a metal salt solution, consisting of a first liquid and a metal salt which can be transformed to a metal oxide by heating,
   b. forming droplets of the said solution,
   c. introducing the said droplets into a body of a drying liquid, which drying liquid is miscible with the said first liquid, but in which drying liquid the metal salt is less than one percent soluble, the relative proportions of metal salt, first liquid and drying liquid being such that a substantial quantity of the metal salt is insoluble in the resulting solution of first and drying liquids, and the metal salt being one which upon interdiffusion of said first and drying liquids crystallizes in the form of metal salt particles avoiding any intermediate hydroxide state,
   d. recovering the crystallized metal salt particles,
   e. heating the recovered crystallized metal salt particles to convert them to metal oxide particles,
   f. pressing said metal oxide particles into a compact unitary body, and
   g. firing said compact unitary body at a sintering temperature to convert said body into a metal oxide ceramic body.

2. The method of claim 1 in which the metal salt is an aluminum salt.

3. The method of claim 1 in which the ceramic body is a body of a magnetic ferrite and the metal salt is a mixture of salts of iron and metals which form with iron a magnetic ferrite.

4. The method of claim 3 in which the metal salt is a mixture of magnesium, manganese and iron sulfates and the ceramic body is a magnetic magnesium manganese ferrite.

* * * * *